United States Patent Office 3,513,825
Patented May 26, 1970

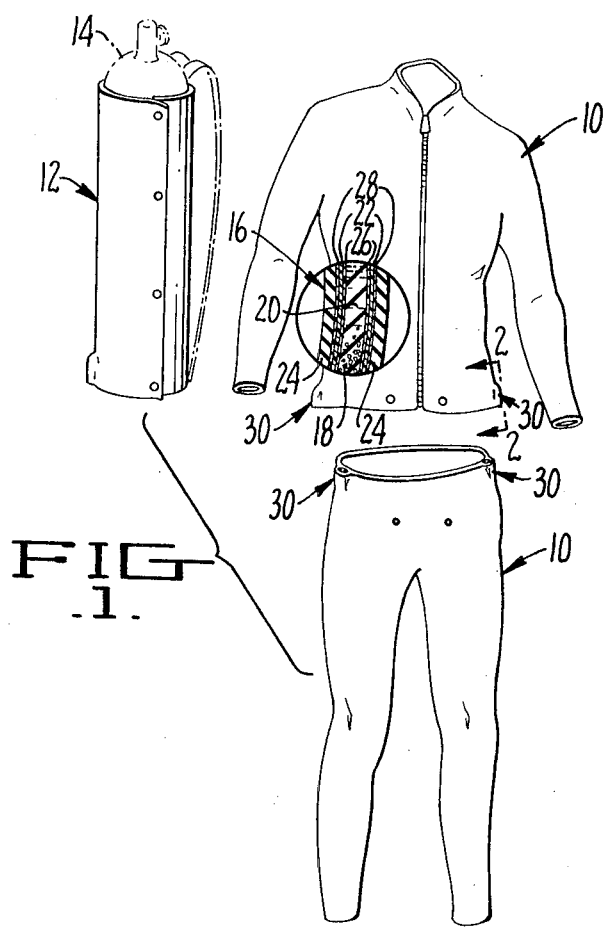

3,513,825
PROTECTIVE DIVING SUIT
Francis H. Chun, 3140 Waialae Ave.,
Honolulu, Hawaii 96816
Continuation-in-part of application Ser. No. 630,674,
Apr. 13, 1967. This application Dec. 26, 1968, Ser.
No. 787,030
Int. Cl. A61f 7/06; B63c 11/04
U.S. Cl. 126—204
8 Claims

ABSTRACT OF THE DISCLOSURE

A diving suit formed of a protective laminate having a flexible foam core provided with intercommunicating cells, an elastomer foam skin at each side of the core in secured relation thereto, and a liquid filling the core.

---

This application is a continuation-in-part of my co-pending application, Ser. No. 630,674, filed Apr. 13, 1967, now abandoned.

SUMMARY OF THE INVENTION

An improved diving suit of the wet suit type characterized by a liquid, preferably distilled water, enclosed between a pair of elastomer foam skins, and means to secure the skins together and to substantially uniformly distribute the liquid between said skins comprising an open-cell foam core secured to and between said skins.

An object of the invention is to provide a diving suit of the wet suit type which is substantially incompressible under the supra-atmospheric pressures encountered at sea depths of the order of hundreds of feet.

Another object of the invention is to provide a diving suit of the wet suit type which will not be destroyed by helium permeation during ascent to the surface.

Still a further object of the invention is to provide a diving suit of the wet suit type which embodies means for efficiently absorbing, storing and furnishing heat.

Other objects and advantages of the invention will be apparent from the following description taken in conjunction with the drawing forming part of this specification, and in which:

FIG. 1 is a view in perspective showing the invention both in the form of a two-piece diving suit and in the form of a one-piece protective enclosure, or jacket, for a gas supply tank;

FIG. 2 is an enlarged detail view, partly broken away and partly in section, taken generally along lines 2—2 of FIG. 1; and FIG. 3 is an enlarged sectionalized view in perspective of a preferred laminate of the invention, the laminate layers being shown both in separated and unseparated condition.

The diving suit 10 and the protective enclosure 12 for gas supply tank 14, both suit 10 and enclosure 12 embodying the subject invention, are formed substantially throughout of a composite wall or laminate indicated generally by 16. Laminate 16 comprises foam core layer 18, liquid 20, core skin layers 22, outer foam skin layers 24, and bonding resin layers 26 and 28 securing, respectively, the core skin layers 22 to the core layer 18 and the outer foam skin layers 24 to the core skin layers 22.

Core layer 18 is formed of a material in which the cells are open or intercommunicating so that the liquid 20 therein will have continuity of mass distribution. A suitable material for core layer 18 is flexible polyurethane foam. A suitable thickness for the core layer is about three-sixteenths of an inch.

The outer foam skin layers 24 are preferably formed of a material which is similar in type to the material forming core layer 18. A suitable material for layers 24 is polyurethane elastomer foam or neoprene elastomer foam. A suitable thickness for each layer 24 is about one-eighth of an inch.

The liquid 20 is preferably distilled water. After formation of laminate 16, but before it is completely edge-sealed, the intercommunicating cells for pores of core layer 18 are completely filled with distilled water. The water serves the purposes of rendering the core layer incompressible, rendering the core layer impermeable to helium, and serving as an efficient medium for absorbing, storing, and furnishing heat. The foam core layer 18, on the other hand, serves the purposes of holding the walls of the suit together so that it will not sag out of shape because of the weight of the water and of preventing the water from surging back and forth within the walls of the suit in response to movements of the wearer.

The suit is well adapted for use efficiently at relatively great sea depths and for relatively long periods of time, such as under the conditions encountered in the "Sea Lab II" experiment, i.e. where the divers lived for weeks in a habitat at a depth of about 200 feet. At this depth the pressure was about seven atmospheres, the temperature about 50° F., and the workers breathed a gas mixture consisting of about four parts of helium and one part of oxygen. Under such conditions, the factors working against the well-being of divers are the cold, the pressure, and the very high penetrating and heat conducting properties of helium.

Under such conditions the conventional wet suit made of closed-cell neoprene foam undergoes an initial reduction of its air spaces under the pressure condition encountered, so that a suit wall thickness of one-quarter of an inch becomes reduced to about one-sixteenth of an inch. In an undersea lab where the atmosphere is mainly helium, the helium penetrates the suit walls, filling the air spaces, and restoring the walls to about their original thickness. However, the helium-impregnated walls cause a rapid dissipation of body heat to atmosphere, and the high pressure helium in the suit walls expands and destroys the suit as the diver approaches the surface.

In a habitat in which the atmosphere for breathing is mainly helium, e.g. "Sea Lab II," the outer foam skin layers 24 of the subject suit would be of the open or intercommunicating cell form and would be equipped with at least one adjustable valve for the inflow and outflow of a compressed gas, said compressed gas serving to insulate the diver from the heated core liquid 20 and to insulate the heated core liquid from the cold water. To the outside surfaces of such open-cell skins 24 there would be bonded elastomeric skins, such as 22, to serve as sealant means for skins 24 and to serve as bonding surfaces for the usual inner and outer stretch-nylon surface finishing layers, not shown, of the suit. For lesser depths, i.e. such as 200 feet or less, or for habitats at such lesser depths where the atmosphere is not mainly helium, the outer skin layers 24 may be of the unicellular or non-interconnecting cell form.

The core filler liquid 20 serves as a heat trap for body heat and therefore as a source of heat for the wearer; the core filler liquid, by displacing the air which previously occupied the cells or pores of the core, renders the core incompressible; and liquid 20 serves as a highly efficient barrier to helium penetration or permeation.

Metallic foil layers, not shown, may be included in the suit laminate, e.g. one such layer being disposed inwardly of the core layer 18 and one such layer being disposed outwardly of said layer. The functions of such foil layers are to shield out helium even when the helium is pressurized to as much as twenty-five atmospheres and to reflect back the radiant heat of the heated core liquid.

Hence, such foil layers are preferably present when the sea depth and the ambient temperature of the hibitat or living space are greater than those which were encountered with "Sea Lab II."

The invention further includes means for heating the suit 10 and the gas supply tank jacket 12 either immediately prior to a dive or while the diver is operating at working depth. The heating means generally indicated by 30 comprises an immersion-type heating cartridge 32, having a plug-in socket 34, and a source of current 36, which may be carried by the diver along with a suitable portable battery or other power supply. Surrounding the heating cartridge is a space 38 which is free of core layer material and occupied by liquid 20.

By heating the liquid 20 within suit 10 and within the tank jacket 12 to 212° F., loss of body heat due to immersion and exhalation is minimized.

Aside from suits and equipment enclosures, the invention may be embodied in other forms of protective enclosures, such as shoes, gloves and headgear.

What is claimed is:

1. Protective diving apparel formed of a laminate comprising an inner core layer and a pair of outer skin layers disposed in secured relation with said core layer, said core layer being composed of a foamed flexible material having intercommunicating cells, said skin layers being composed of an elastomeric foam plastic, said laminate being formed in the shape of a body portion-enclosing garment.

2. Protective diving apparel according to claim 1, said laminate including a liquid in a mobile state filling the intercommunicating cells of said core layer, and means for enclosing said core layer and confining said liquid to said core layer.

3. Protective diving apparel according to claim 2, said laminate including means for heating the liquid within said core layer, said means for heating comprising at least one heating cartridge of the immersion type disposed in heat transfer association with said liquid.

4. Protective diving apparel according to claim 3, said liquid being distilled water.

5. For an article of the type described, a laminate comprising an inner core layer of foamed flexible material having intercommunicating cells, intermediate layers of metallic foil disposed outwardly of said core layer in secured relation thereto and outer layers of elastomeric foam plastic disposed outwardly of said layers of metallic foil in secured relation thereto.

6. The laminate of claim 5, including a liquid filling the intercommunicating cells of said core layer, and means for enclosing the edges of said core layer to confine said liquid to said core layer.

7. The laminate of claim 6, including means for heating the liquid within said core layer, said means for heating comprising at least one heating cartridge of the immersion type disposed in heat transfer association with said liquid.

8. The laminate of claim 7, said liquid being distilled water.

References Cited
UNITED STATES PATENTS

| | | | |
|---|---|---|---|
| 586,998 | 7/1897 | Harmer | 165—46 |
| 3,082,611 | 3/1963 | Alvis et al. | 165—46 |
| 3,118,153 | 1/1964 | Hood | 5—345 |
| 3,236,007 | 2/1966 | Abeson | 46—157 |

CHARLES J. MYHRE, Primary Examiner

U.S. Cl. X.R.

2—2.1